(12) United States Patent
Kapela

(10) Patent No.: US 11,671,698 B1
(45) Date of Patent: Jun. 6, 2023

(54) UNIVERSAL LENS-TAKING OPTICAL VIEWFINDER

(71) Applicant: Zachary Kapela, Brooklyn, NY (US)

(72) Inventor: Zachary Kapela, Brooklyn, NY (US)

( * ) Notice: Subject to any disclaimer, the term of this patent is extended or adjusted under 35 U.S.C. 154(b) by 0 days.

(21) Appl. No.: 17/563,650

(22) Filed: Dec. 28, 2021

Related U.S. Application Data

(60) Provisional application No. 63/131,191, filed on Dec. 28, 2020.

(51) Int. Cl.
*H04N 23/63* (2023.01)
*H04N 23/55* (2023.01)
*H04N 23/67* (2023.01)

(52) U.S. Cl.
CPC .............. *H04N 23/63* (2023.01); *H04N 23/55* (2023.01); *H04N 23/673* (2023.01)

(58) Field of Classification Search
CPC ....... H04N 23/63; H04N 23/55; H04N 23/673
See application file for complete search history.

(56) References Cited

U.S. PATENT DOCUMENTS

| 2003/0030912 | A1* | 2/2003 | Gleckman | G02B 27/0172 359/638 |
| 2010/0202725 | A1* | 8/2010 | Popovich | G02B 27/425 385/10 |
| 2013/0194458 | A1* | 8/2013 | Nayar | H04N 23/80 348/241 |
| 2016/0327906 | A1* | 11/2016 | Futterer | G03H 1/2294 |
| 2022/0360751 | A1* | 11/2022 | Greenstein | G02B 27/0018 |

* cited by examiner

*Primary Examiner* — Christopher K Peterson

(57) ABSTRACT

A universal lens-taking optical viewfinder allows a user to see an input image through a series of optics that begins with the actual lens being used for a production. The universal lens-taking optical viewfinder includes an image-forming optical assembly, an aspect-ratio mask assembly, an attachment mechanism, and a viewfinder assembly. The image-forming optical assembly is designed to eliminate the need for multiple ground glasses and the need to handle fragile and expensive glass. The aspect-ratio mask assembly allows the universal lens-taking optical viewfinder to achieve any aspect ratio. The attachment mechanism allows the aspect-ratio mask assembly to be secured to the image-forming optical assembly. The viewfinder assembly provides optical components of a conventional director's viewfinder such as, but not limited to, an optical relay assembly, an eyepiece assembly, and a lens mount. The image-forming optical assembly and the aspect-ratio mask assembly are optically integrated into the viewfinder assembly.

17 Claims, 17 Drawing Sheets

UNIVERSAL LENS-TAKING OPTICAL VIEWFINDER

The current application claims a priority to the U.S. Provisional Patent application Ser. No. 63/131,191 filed on Dec. 28, 2020.

FIELD OF THE INVENTION

The present invention generally relates to optical devices. More specifically, the present invention is a universal lens-taking optical viewfinder that allows a user to see an image through a series of optics that begins with the actual lens being used for a production.

BACKGROUND OF THE INVENTION

An improved optical device (e.g., Direct Viewing Lens Finder (DVLF)) is in demand. Cameras use various components, including lenses; optical filters; electronic image sensor arrays, celluloid, and electronic circuits to capture, process, and store images from those arrays; memory devices; power supplies; and a display system.

Generally, these components are integrated and interdependent, and in many cases external lenses may be attached to and removed from the camera. However, many other components can be permanently integrated into a main housing with no mechanism for removal and replacement.

The performance and functionality of conventional cameras can be limited, so that in some cases obtaining the benefit of technological improvements requires replacement of entire components or even the camera itself. Additionally, because of the limited configurability associated with conventional cameras, their applications are typically limited. Accordingly, optical devices and accessories that encompass various categories of lenses or other components are needed.

In the world of image capturing, digital sensors continue to get larger and cheaper. In particular, the motion picture industry now has digital sensors that have surpassed the iconic 65 mm film/celluloid aperture of 48.565 mm×22.01 mm (53.32 mm image circle), and the Arri Alexa65, for example, has a 54.12 mm×25.58 mm digital sensor (59.86 mm image circle).

Today in the motion picture, television, and broadcast industries this is considered "Large Format." And in this "Large Format," far fewer lenses and lens accessory options are available than are available for the longtime industry standard of Super 35 mm (31.10 mm image circle). Thus, there is a need to develop new optical devices and accessories that solve this problem.

The present invention is intended to address this problem and those associated with and/or otherwise improve on conventional devices through an innovative optical device that is designed to be convenient, durable, and affordable to use while incorporating other problem-solving features.

DETAIL DESCRIPTIONS OF THE INVENTION

All illustrations of the drawings are for the purpose of describing selected versions of the present invention and are not intended to limit the scope of the present invention.

Figure 1:
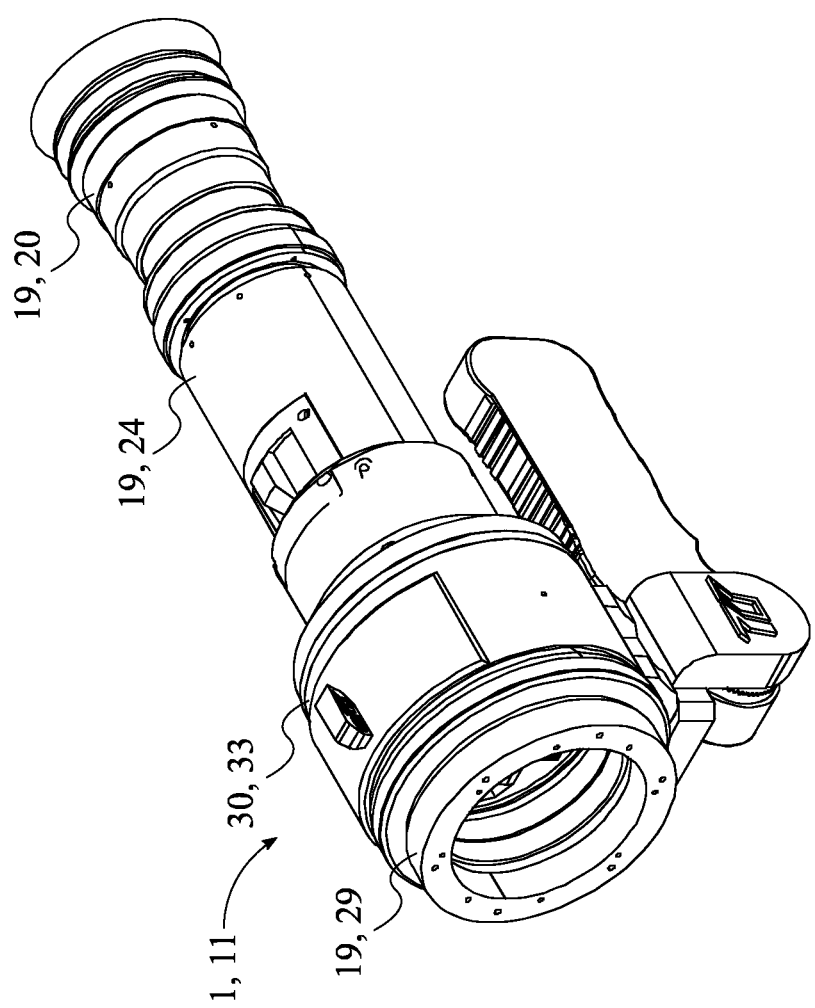
FIG. 1 is a perspective view of the present invention.
Figure 2:
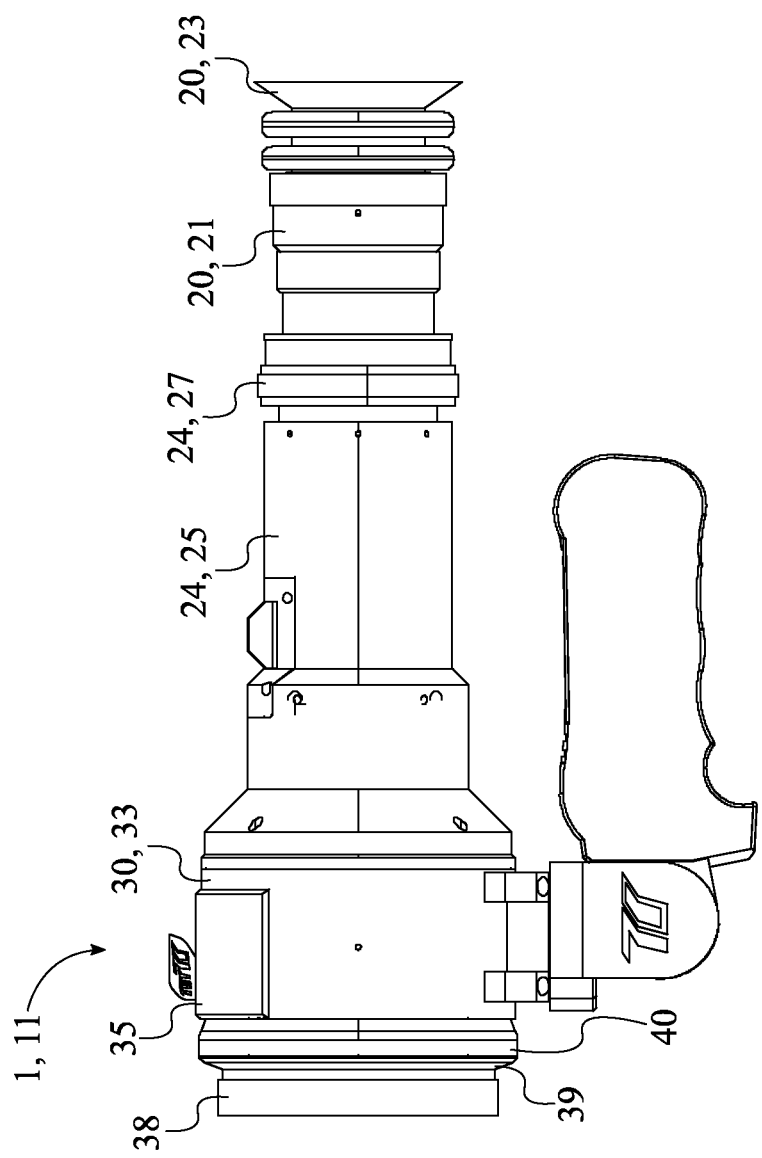
FIG. 2 is a left-side view of the present invention.

In reference to FIGS. 1 through 16, the present invention is a universal lens-taking optical viewfinder that allows a user to see an input image through a series of optics that begins with the actual lens being used for a production. The present invention comprises an image-forming optical assembly 1, an aspect-ratio mask assembly 11, an attachment mechanism 16, and a viewfinder assembly 19. The image-forming optical assembly 1 is designed to eliminate both the need for multiple ground glasses and the need to physically handle fragile and expensive glass. The aspect-ratio mask assembly 11 allows the present invention to achieve any aspect ratio and may be designed for any image/video format, resolution, and specification of any given optical device such as a camera. The attachment mechanism 16 allows the aspect-ratio mask assembly 11 to be secured to the image-forming optical assembly 1. The viewfinder assembly 19 provides optical components of a conventional director's viewfinder such as, but not limited to, an optical relay assembly 24, an eyepiece assembly 20, and a lens mount system 29. With reference to FIGS. 1 and 2, the image-forming optical assembly 1 and the aspect-ratio mask assembly 11 are optically integrated into the viewfinder assembly 19.

Figure 7:
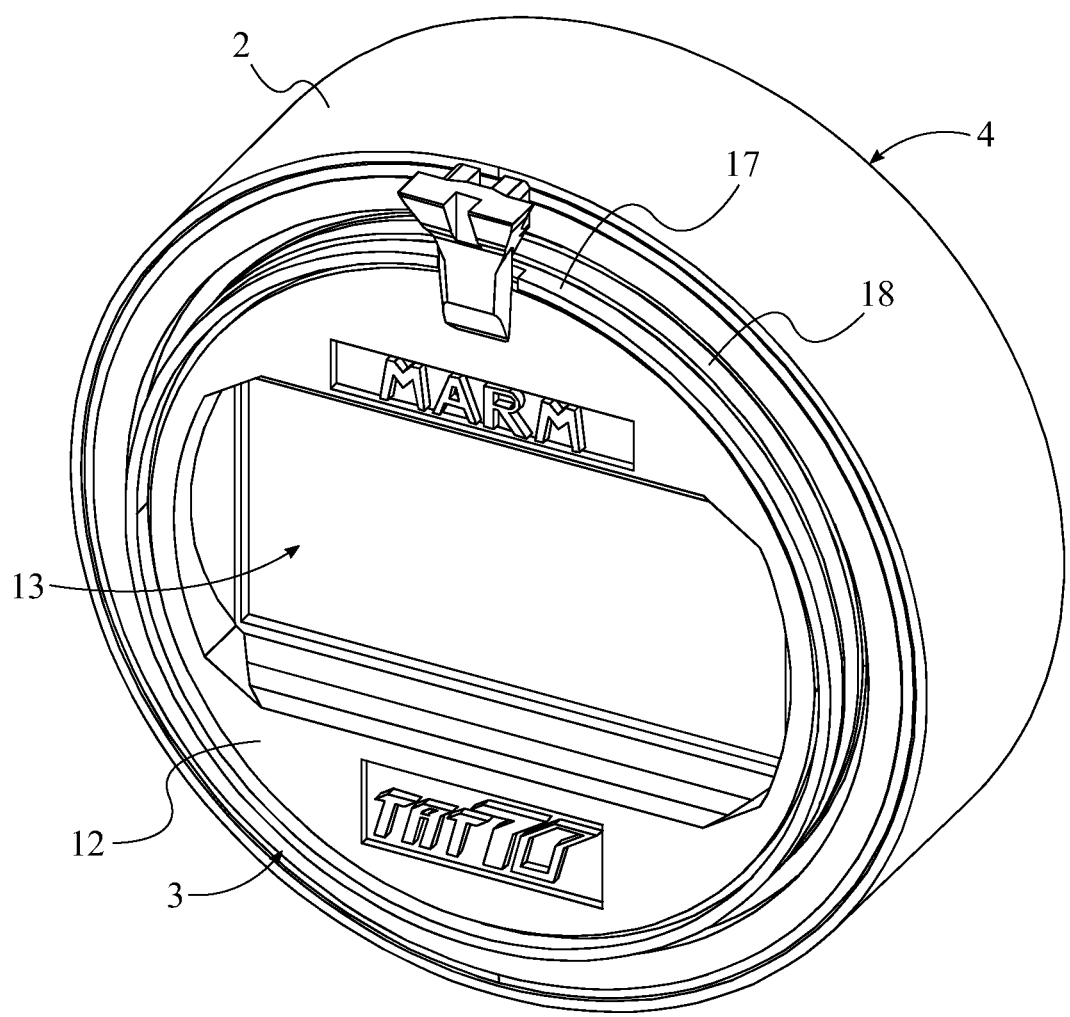
FIG. 7 is a perspective view of the image-forming optical assembly, and the aspect-ratio mask assembly.
Figure 8A:
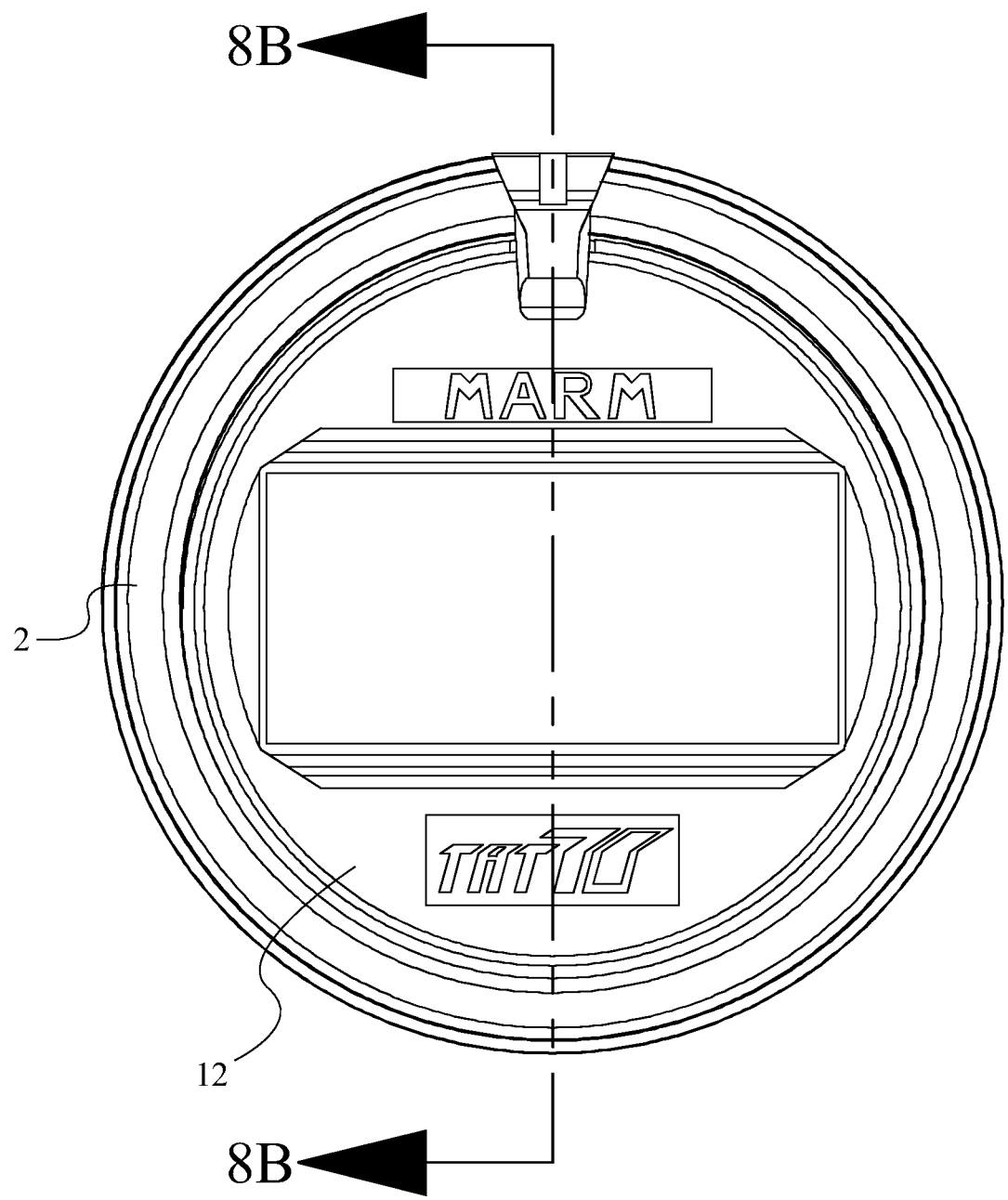
FIG. 8A is a front view of the image-forming optical assembly, and the aspect-ratio mask assembly.

The general configuration of the aforementioned components allows the present invention to eliminate the need for multiple ground glasses while being able to achieve any aspect ratio. With reference to FIGS. 7 through 9, the image-forming optical assembly 1 comprises an inner tubular housing 2, a field lens 5, and a ground-glass diffuser 8. The present invention includes only one ground glass defined by the ground-glass diffuser 8. The ground-glass diffuser 8 acts as the image plane and must be situated precisely at the flange focal distance (FFD) of a given lens type. The ground-glass diffuser 8 is preferably a circular ground glass with a diameter larger than 60 mm. This means the ground-glass diffuser 8 can potentially see an image circle of 60 mm or greater, thus covering the sensor dimensions of an Alexa65 camera and beyond. The field lens 5 is preferably a Plano convex lens with a diameter larger than 60 mm. The diameter and type choice of the field lens 5 are to not only cover the Alex65 sensor, but to also allow the present invention to be ready for larger sensors in the future. The inner tubular housing 2 safely contains and protects the field lens 5 and the ground-glass diffuser 8 from natural elements and human handling. The aspect-ratio mask assembly 11 comprises a mask body 12 and a dimensional image-defining cutout 13. The mask body 12 is designed to fit against the inner tubular housing 2. The dimensional image-defining cutout 13 provides frame lines for any dimension possible within the diameter of the ground-glass diffuser 8 and the field lens 5. The inner tubular housing 2 comprises a first inner open end 3 and a second inner open end 4, the ground-glass diffuser 8 comprises a ground input surface 9 and a polished output surface 10, and the field lens 5 comprises an input lens surface 6 and an output lens surface 7. The field lens 5 and the ground-glass diffuser 8 are mounted within the inner tubular housing 2 in order to keep the field lens 5 and the ground-glass diffuser 8 in place within the inner tubular housing 2. In more detail, the field lens 5 is preferably mounted within inner tubular housing 2 by a field lens holder 36 and the ground-glass diffuser 8 is preferably mounted within the inner tubular housing 2 by a ground-glass holder 37. In order to ensure that an input image is effectively formed and framed by the present invention, the ground input surface 9 is oriented towards the first inner open end 3, the polished output surface 10 is oriented towards the input lens surface 6, the input lens surface 6 is oriented towards the polished output surface 10, and the output lens surface 7 is oriented towards second inner open end 4. Further, the dimensional image-defining cutout 13 traverses through the mask body 12 in order to create frame lines. The mask body 12 is attached to the first inner open end 3 by the attachment mechanism 16. This arrangement allows a user to selectively attach or detach the aspect-ratio mask assembly 11 from the image-forming optical assembly 1. Lastly, the dimensional image-defining cutout 13, the ground-glass diffuser 8, and the field lens 5 are in optical serial communication with each other in order to effectively frame and form an input image from any optical device such as a photographic lens.

Figure 8B:
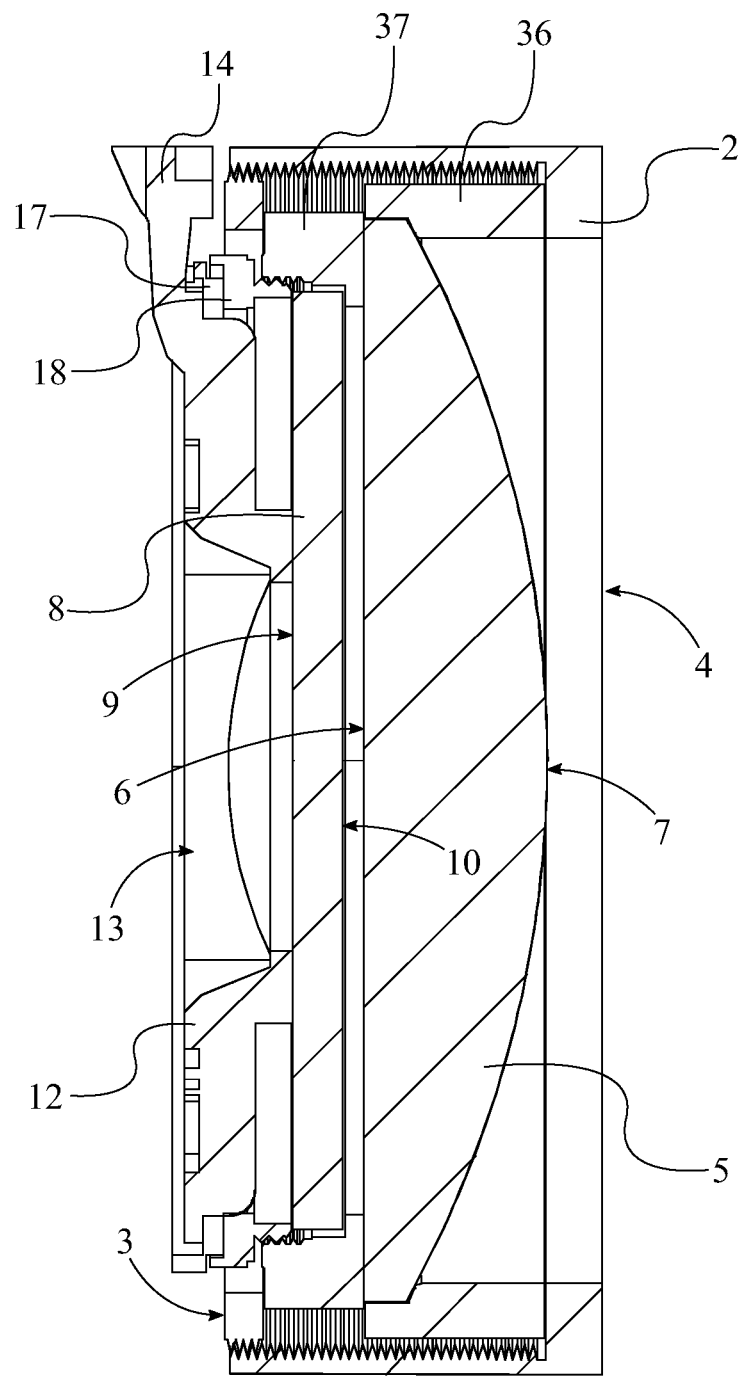
FIG. 8B is a cross-sectional view of the image-forming optical assembly, and the aspect-ratio mask assembly taken along line 8B-8B in FIG. 8A.
Figure 9:
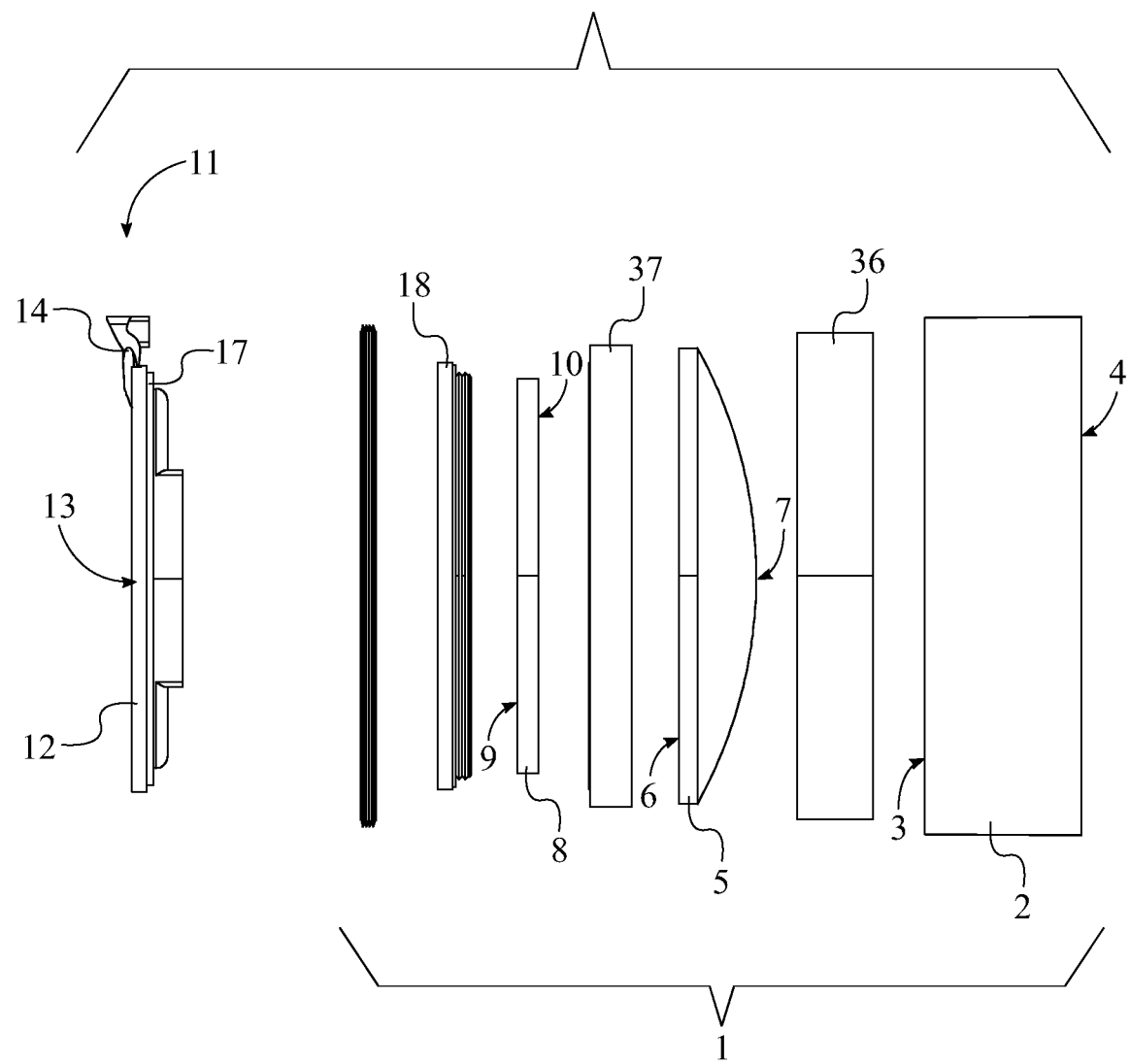
FIG. 9 is an exploded left-side view of the image-forming optical assembly, and the aspect-ratio mask assembly.
Figure 10:
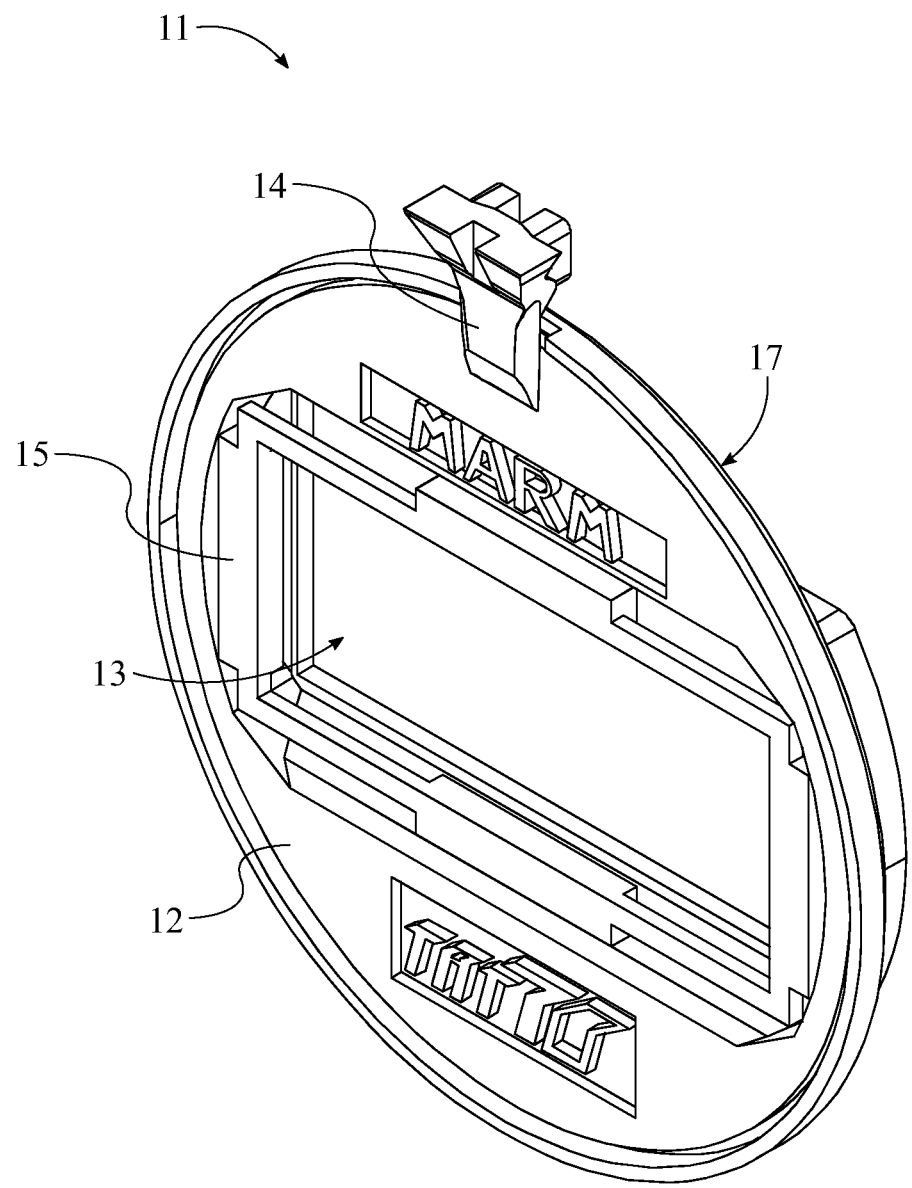
FIG. 10 is a perspective view of the aspect-ratio mask assembly with the at least one aspect-ratio-adjusting insert.
Figure 11:
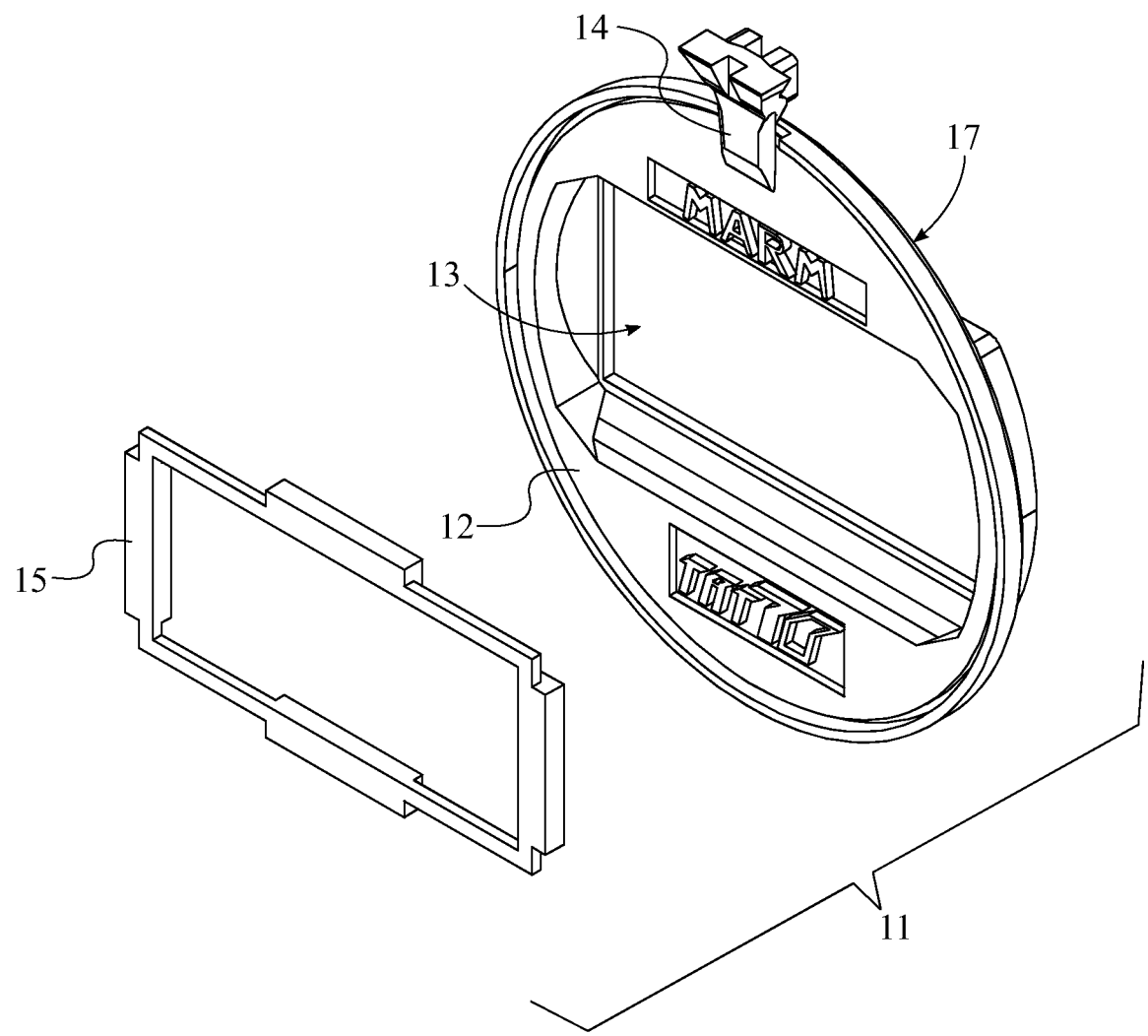
FIG. 11 is an exploded perspective view of the aspect-ratio mask assembly with the at least one aspect-ratio-adjusting insert.

With reference to FIGS. 8B and 9, the preferred type of attachment between the aspect-ratio mask assembly 11 and the image-forming optical assembly 1 is magnetic, and thus, the attachment mechanism 16 comprises at least one first magnetic ring 17 and at least one second magnetic ring 18. The at least one first magnetic ring 17 is preferably made of a ferromagnetic material. The at least one first magnetic ring 17 is laterally connected around the mask body 12 through use of an adhesive. The at least one second magnetic ring 18 is preferably a magnet. The at least one second magnetic ring 18 is mounted within the inner tubular housing 2, adjacent to the first housing end. In more detail, the at least one second magnetic ring 18 is threaded into the inner tubular housing 2 and acts as a retaining ring to maintain the ground-glass holder 37, the ground-glass diffuser 8, the field lens holder 36, and the field lens 5 in place within the inner tubular housing 2. Lastly, the at least one first magnetic ring 17 is magnetically coupled to the at least one second magnetic ring 18 in order to attach the mask body 12 to the first inner open end 3. In another embodiment, the at least one first magnetic ring 17 can be the magnet and the at least one second magnetic ring 18 can be made of ferromagnetic material.

With reference to FIGS. 3 through 6, the present invention may further comprise an outer tubular housing 30 to protect and conceal the aspect-ratio mask assembly 11 and the image-forming optical assembly 1. The outer tubular housing 30 comprises a first outer open end 31 and a second outer open end 32. The image-forming optical assembly 1 and the aspect-ratio mask assembly 11 are mounted within the outer tubular housing 30. In more detail, the image-forming optical assembly 1 is mounted within the outer tubular housing 30 by a set of fasteners and the aspect-ratio mask assembly 11 is mounted within the outer tubular housing 30 through the magnetic attachment between the aspect-ratio mask assembly 11 and the image-forming optical assembly 1. In order to establish the image framing and forming capability of the present invention, the image-forming optical assembly 1 is positioned adjacent to the second outer open end 32, and the aspect-ratio mask assembly 11 is positioned adjacent to the first outer open end 31.

Figure 3:
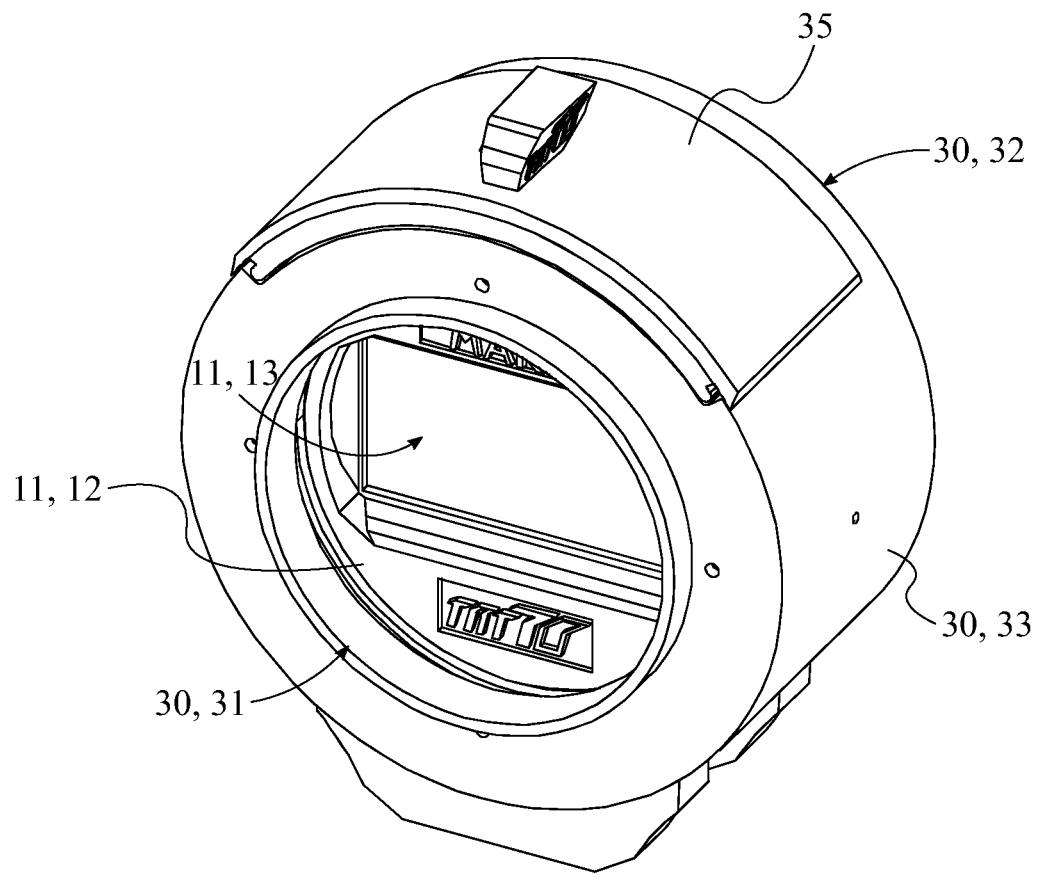
FIG. 3 is a perspective view of the image-forming optical assembly, the aspect-ratio mask assembly, and the outer tubular housing.
Figure 4:
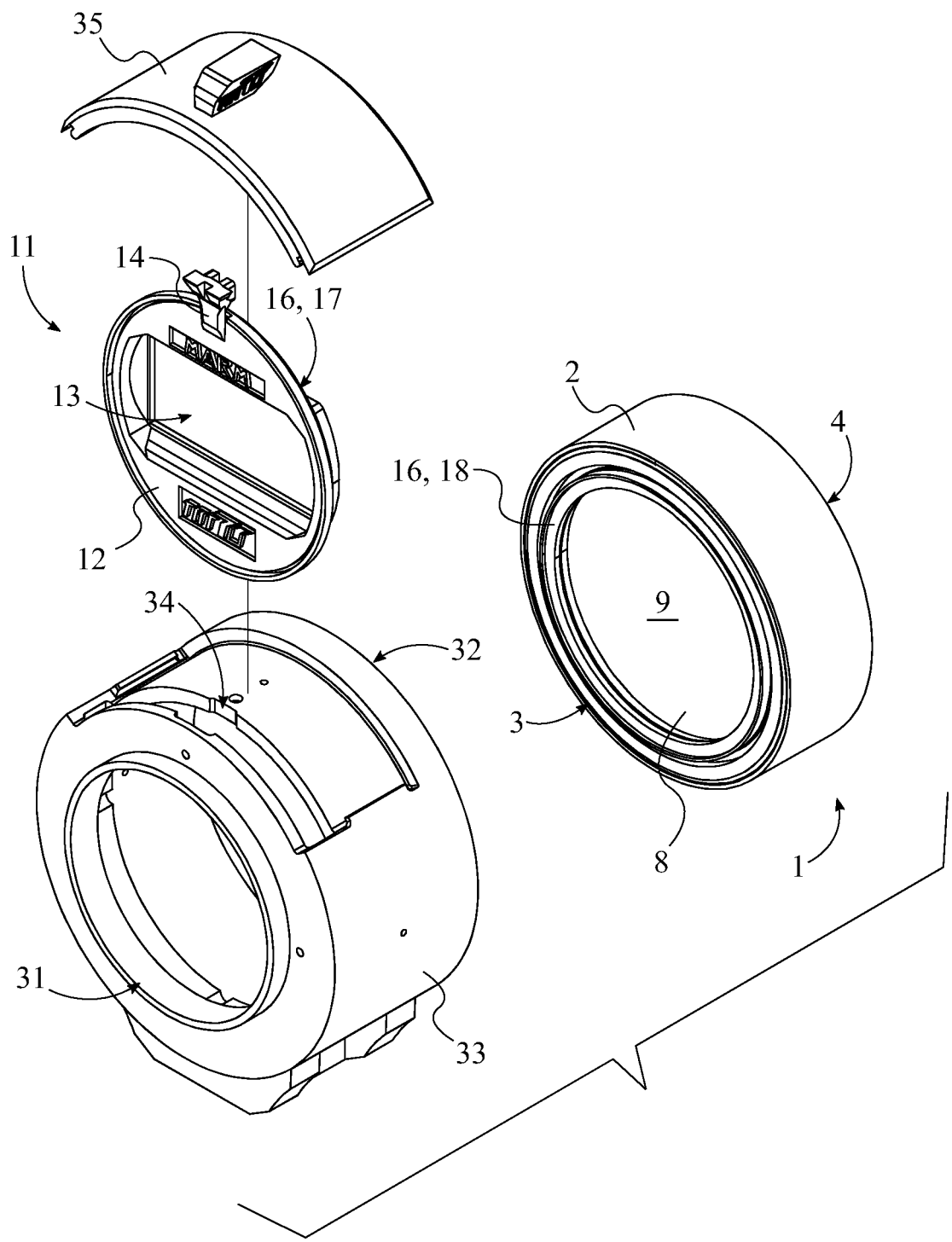
FIG. 4 is an exploded perspective view of the image-forming optical assembly, the aspect-ratio mask assembly, and the outer tubular housing.
Figure 5:
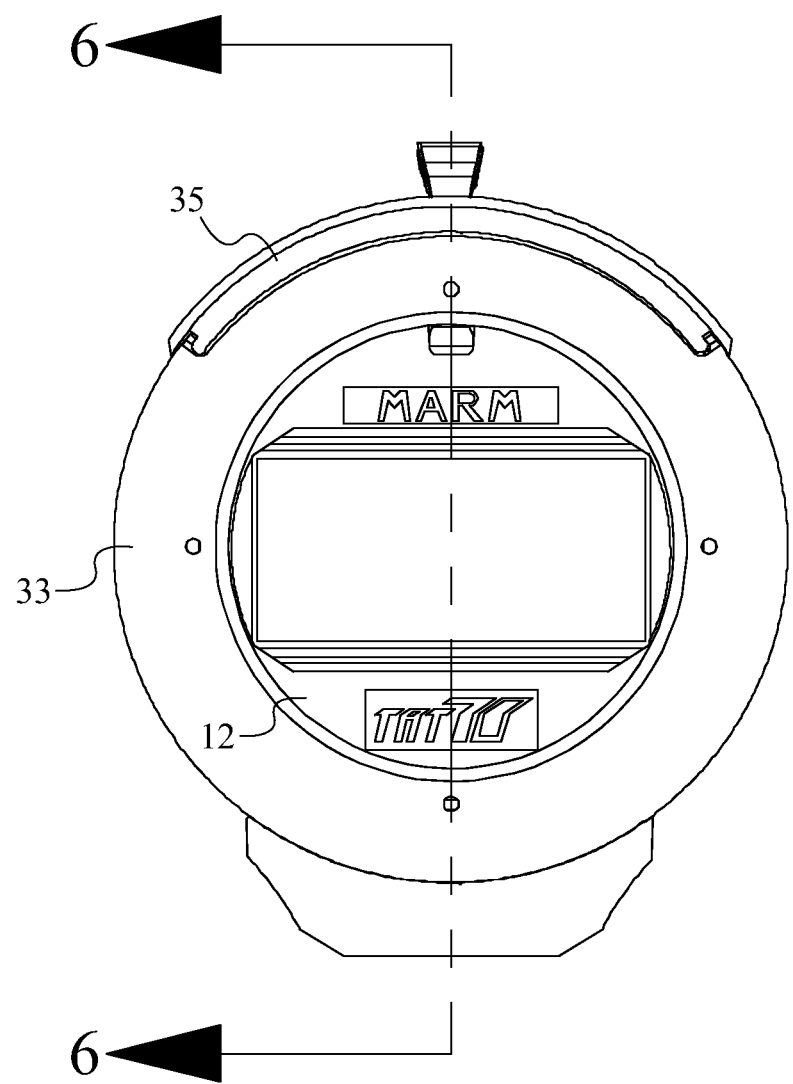
FIG. 5 is a front view of the image-forming optical assembly, the aspect-ratio mask assembly, and the outer tubular housing.
Figure 6:
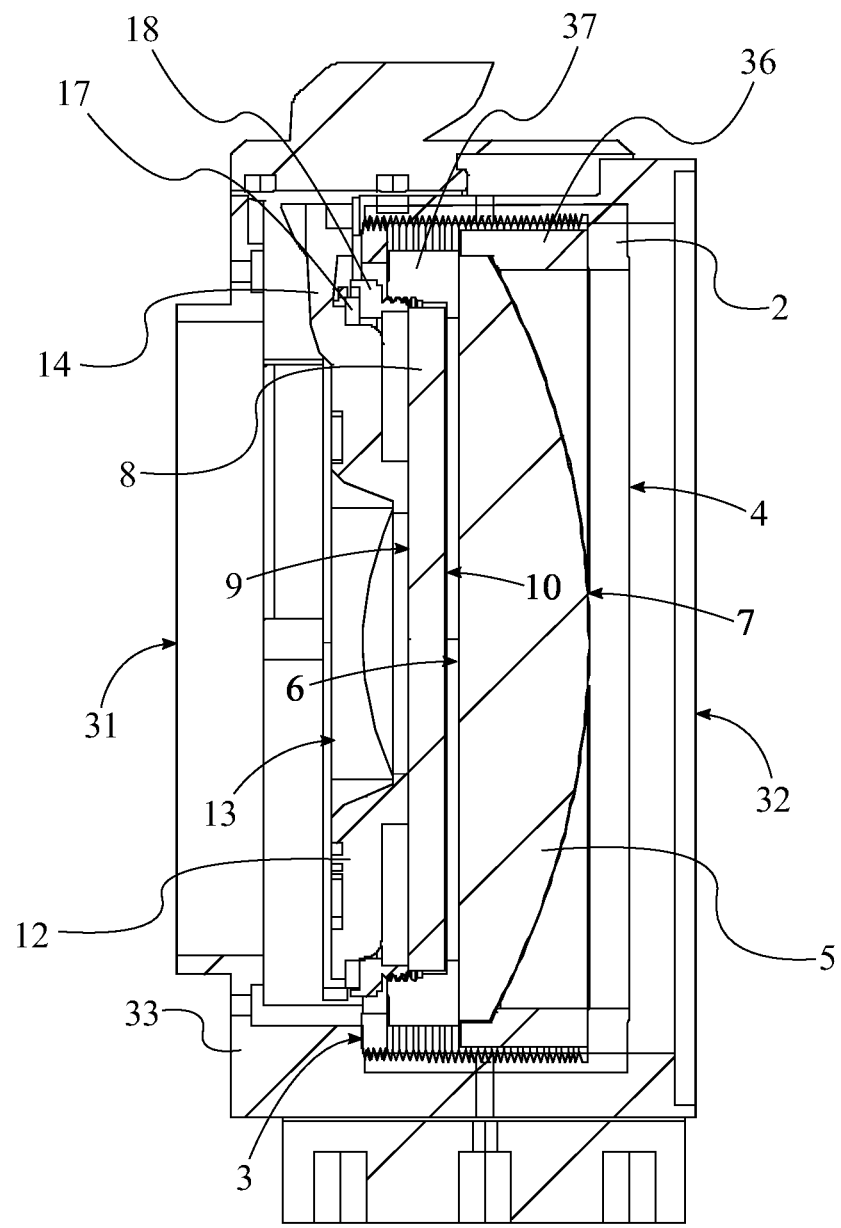
FIG. 6 is a cross-sectional view of the image-forming optical assembly, the aspect-ratio mask assembly, and the outer tubular housing taken along line 6-6 in FIG. 5.

In order to allow the user to remove the aspect-ratio mask assembly 11 to provide maintenance to the aspect-ratio mask assembly 11 and with reference to FIGS. 3 and 4, to replace the aspect-ratio mask assembly 11, or to use different aspect-ratio mask assemblies, the outer tubular housing 30 may further comprise a tubular housing body 33, an access opening 34, and an opening cover 35, and the aspect-ratio mask assembly 11 may further comprise a pull tab 14. The pull tab 14 allows a user to carefully handle the aspect-ratio mask assembly 11. The pull tab 14 is laterally connected to the mask body 12. In more detail, the pull tab 14 is preferably manufactured with the mask body 12 and thus, the pull tab 14 and the mask body 12 are one piece. Moreover, the pull tab 14 is positioned at the top of the mask body 12. The access opening 34 laterally traverses into the tubular housing body 33. In more detail, the access opening 34 is a cutout designed to allow the aspect-ratio mask assembly 11 to be inserted into or removed from the tubular housing body 33. The opening cover 35 is laterally attached to the tubular housing body 33 and is positioned across the access opening 34. In more detail, opening cover 35 is slid into a recessed portion of the tubular housing body 33 in order to conceal the access opening 34. Moreover, this arrangement allows the user to easily attach or detach the opening cover 35 from the tubular housing body 33. The pull tab 14 is positioned adjacent to the access opening 34 in order to be easily accessible to the user.

The aspect-ratio mask assembly 11 includes a first embodiment and a second embodiment. In the first embodiment and with reference to FIGS. 3 and 4, the dimensional image-defining cutout 13 fully defines the aspect ratio and frame lines. In more detail, if the user desires to use another aspect ratio, a different aspect-ratio mask assembly 11 with the desired aspect ratio must be inserted into the tubular housing body 33. In the second embodiment and with reference to FIGS. 10 and 11, the aspect-ratio mask assembly 11 may further comprise at least one aspect-ratio-adjusting insert 15. The at least one aspect-ratio-adjusting insert 15 is attached within the dimensional image-defining cutout 13. In more detail, the at least one aspect-ratio-adjusting insert 15 is press-fitted into the dimensional image-defining cutout 13 in order to allow the user to easily attach or detach the at least one aspect-ratio-adjusting insert 15 from the dimensional image-defining cutout 13. Rather than replacing the entire aspect-ratio mask assembly 11, the user simply needs to remove and replace the at least one aspect-ratio-adjusting insert 15 in order to achieve another aspect ratio.

In order for an input image to be relayed from the image-forming optical assembly 1 to the eye of the user and with reference to FIGS. 1 and 2, the viewfinder assembly 19 comprises an eyepiece assembly 20 and an optical relay assembly 24. The aspect-ratio mask assembly 11, the image-forming optical assembly 1, the optical relay assembly 24, and the eyepiece assembly 20 are in serial optical communication with each other. The eyepiece assembly 20 is configured to receive an input image from the optical relay assembly 24 by including a focus capability. The eyepiece assembly 20 then focuses that image to the user's eye. In some embodiments, to account for differences in individuals' eyesight, the eyepiece assembly 20 may include a +/− diopter adjustment. The eyepiece assembly 20 requires a proper prescription in order to focus on and see the entire input image produced by the optical relay assembly 24. The present invention achieves the best optical image quality with the specifications provided here in. In some embodiments, the eyepiece assembly 20 may include multiple parts including multiple optical elements, that produce a precise focal length with +/− focus/diopter adjustment capability. The optical relay assembly 24 includes a precise optical prescription that accomplishes various functions. The optical relay assembly 24 may be configured to allow the entire input image to be viewed in the correct image orientation and direction, reducing the visual size of the input image before relaying the input image to the eyepiece so as to minimize eyestrain on the user. Without such a reduction, seeing so large an image at such close range would overwhelm the user's eye muscles by requiring them to scan the large image area, but reduction allows the eye to see the entire image without scanning.

Figure 14:
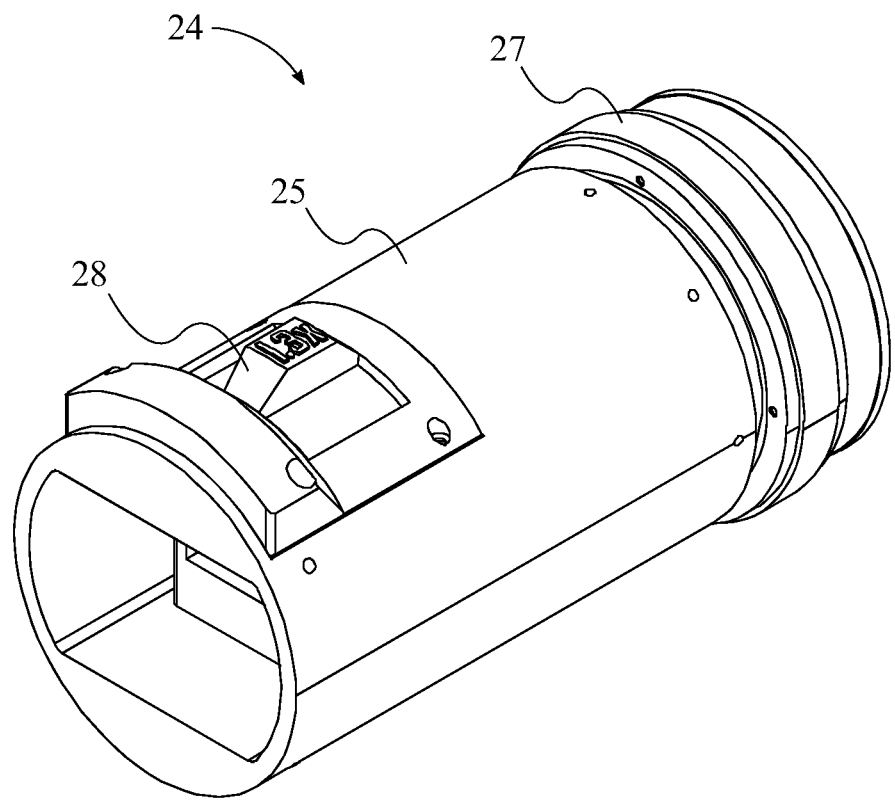
FIG. 14 is a perspective view of the optical relay assembly.
Figure 15:
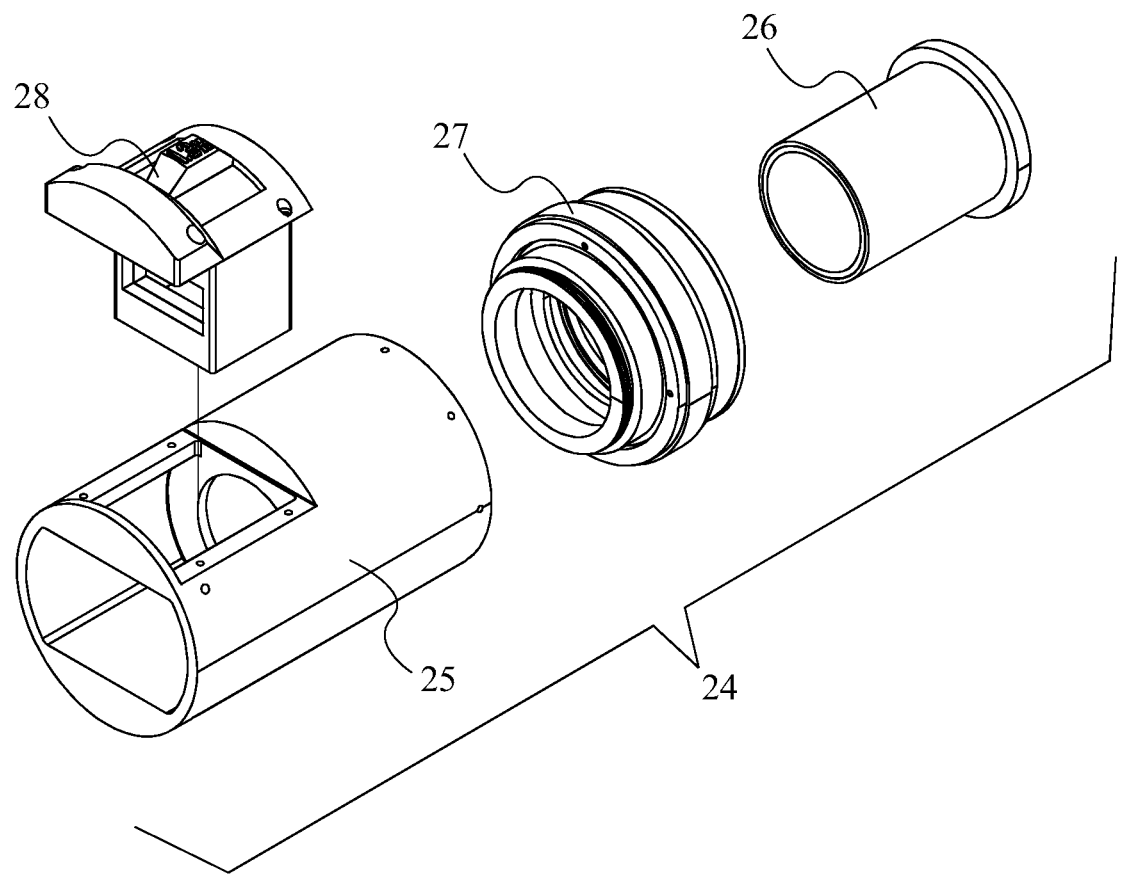
FIG. 15 is an exploded perspective view of the optical relay assembly.

In order for the optical relay assembly 24 to effectively reduce the visual size of the input image and with reference to FIGS. 14 and 15, the optical relay assembly 24 comprises a relay tubular housing 25, a relay lensing module 26, and a zoom helicoid 27. The relay lensing module 26 is mounted within the relay tubular housing 25. In more detail, the relay lensing module 26 is mounted within the relay tubular housing 25 by a threaded retaining ring. The relay lensing module 26 comprises a lens tubular housing, a plurality of relay optics, and a plurality of relay spacing shims. The plurality of relay spacing shims is dispersed in between the plurality of relay optics. The plurality of relay optics and the plurality of relay spacing shims is mounted within the lens tubular housing by a front retaining ring and a rear retaining ring. The relay lensing module 26 reduces the visual size of the input image through the plurality of relay optics. The zoom helicoid 27 is terminally mounted to the relay tubular housing 25, opposite to the image-forming optical assembly 1. In more detail, the zoom helicoid 27 is preferably threaded into the relay tubular housing 25. The zoom helicoid 27 allows the user to zoom in (magnify) and zoom out (de-magnify) the input image to user's eye. In order for the optical relay assembly 24 to effectively reduce the visual size of an input image, the relay lensing module 26, and the zoom helicoid 27 are in serial optical communication with each other.

Additionally and with reference to FIG. 15, the optical relay assembly 24 may further comprise at least one anamorphic module 28 to decompress the compressed anamorphic input image to the user's eye. For example, the at least one anamorphic module 28 can embody the compression ratios ranging from 1.1× and greater. The at least one anamorphic module 28 is laterally attached into the relay tubular housing 25, adjacent to the image-forming optical assembly 1. In more detail, the at least one anamorphic module 28 is slid into a recessed area of the relay tubular housing 25. Further, the optical relay assembly 24 may further comprise a module box cover and a module access. The module opening traverses into relay tubular housing 25 to allow the at least one anamorphic module 28 to be inserted into or removed from the relay tubular housing 25. The module box cover is laterally attached to the relay tubular housing 25 by a set of fasteners and is positioned across the module opening. Moreover, in order for the at least one anamorphic module 28 to aid the present invention in de-compressing the compressed anamorphic input image to the user's eye, the at least one anamorphic module 28, the relay lensing module 26, and the zoom helicoid 27 are in serial optical communication with each other.

Figure 12:
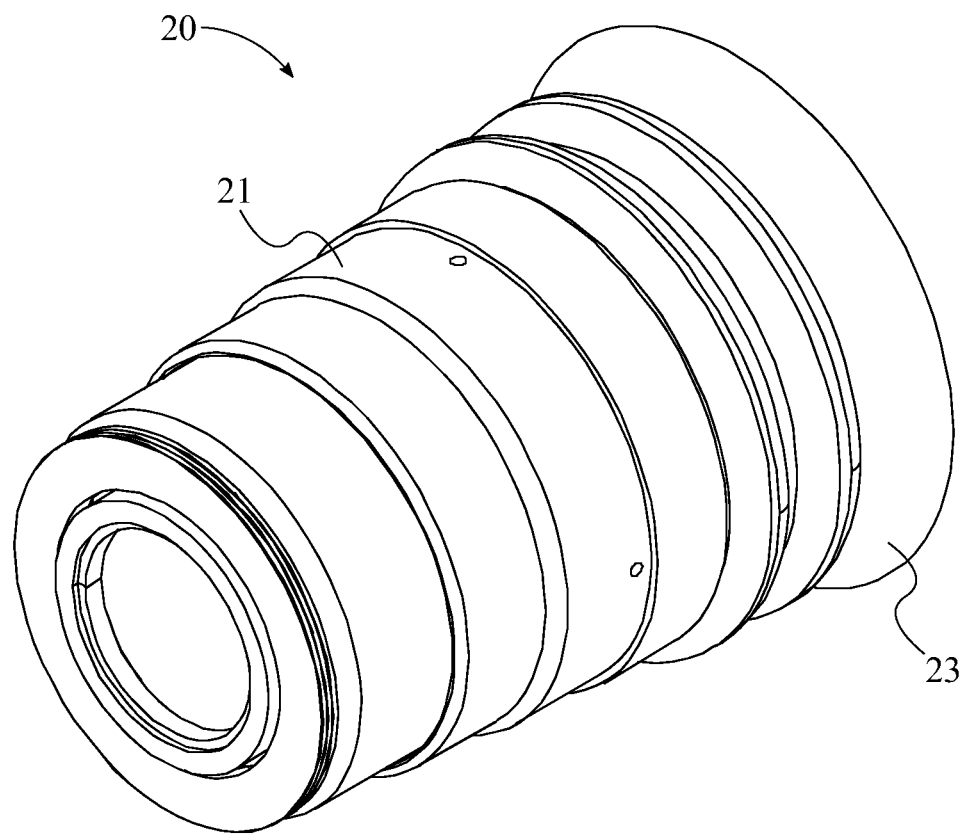
FIG. 12 is a perspective view of the eyepiece assembly.
Figure 13:
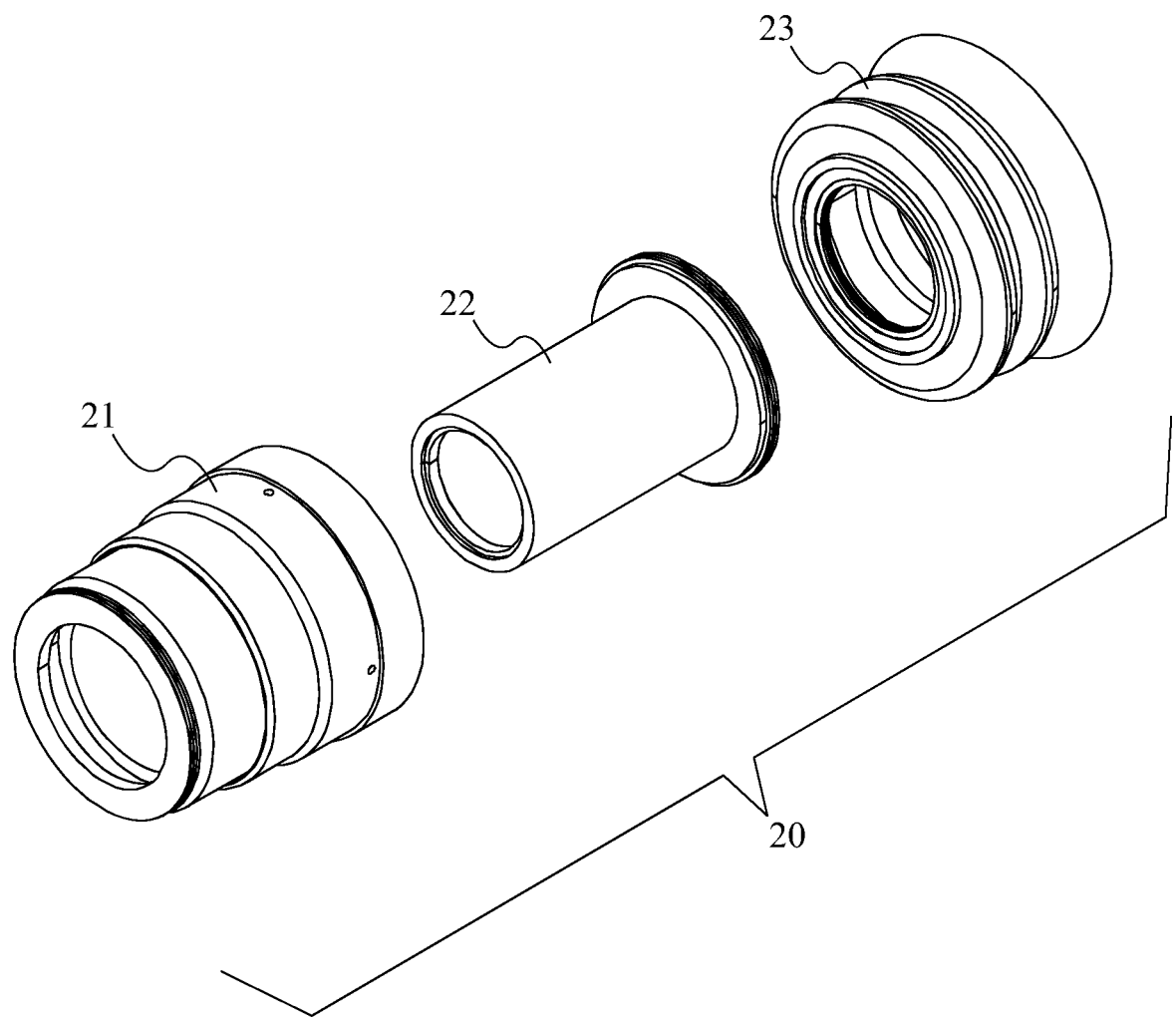
FIG. 13 is an exploded perspective view of the eyepiece assembly.

In order for the eyepiece assembly 20 to effectively receive an input image from the optical relay assembly 24 and then focus the input image to user's eye and with reference to FIGS. 12 and 13, the eyepiece assembly 20 comprises an eyepiece tubular housing 21, an eyepiece lensing module 22, and an eyecup 23. The eyepiece lensing module 22 is mounted within the eyepiece tubular housing 21. In more detail, the eyepiece lensing module 22 is threaded into the eyepiece tubular housing 21. The eyepiece lensing module 22 comprises a plurality of eyepiece optics, and a plurality of eyepiece spacing shims. The plurality of eyepiece spacing shims is dispersed in between the plurality of eyepiece optics. The eyepiece lensing module 22 receives the input image from the optical relay system and then focuses the input image to user's eye through the plurality of eyepiece optics. The eyecup 23 is terminally mounted to the eyepiece tubular housing 21, opposite to the optical relay assembly 24. In more detail, the eyecup 23 is threaded onto the eyepiece tubular housing 21. The eyecup 23 provides a comfortable rest for the user's eye. In order for the eyepiece assembly 20 to receive the input image from the optical relay assembly 24 and then focus the input image to user's eye, the eyepiece lensing module 22 and the eyecup 23 are in serial optical communication with each other.

Figure 16:
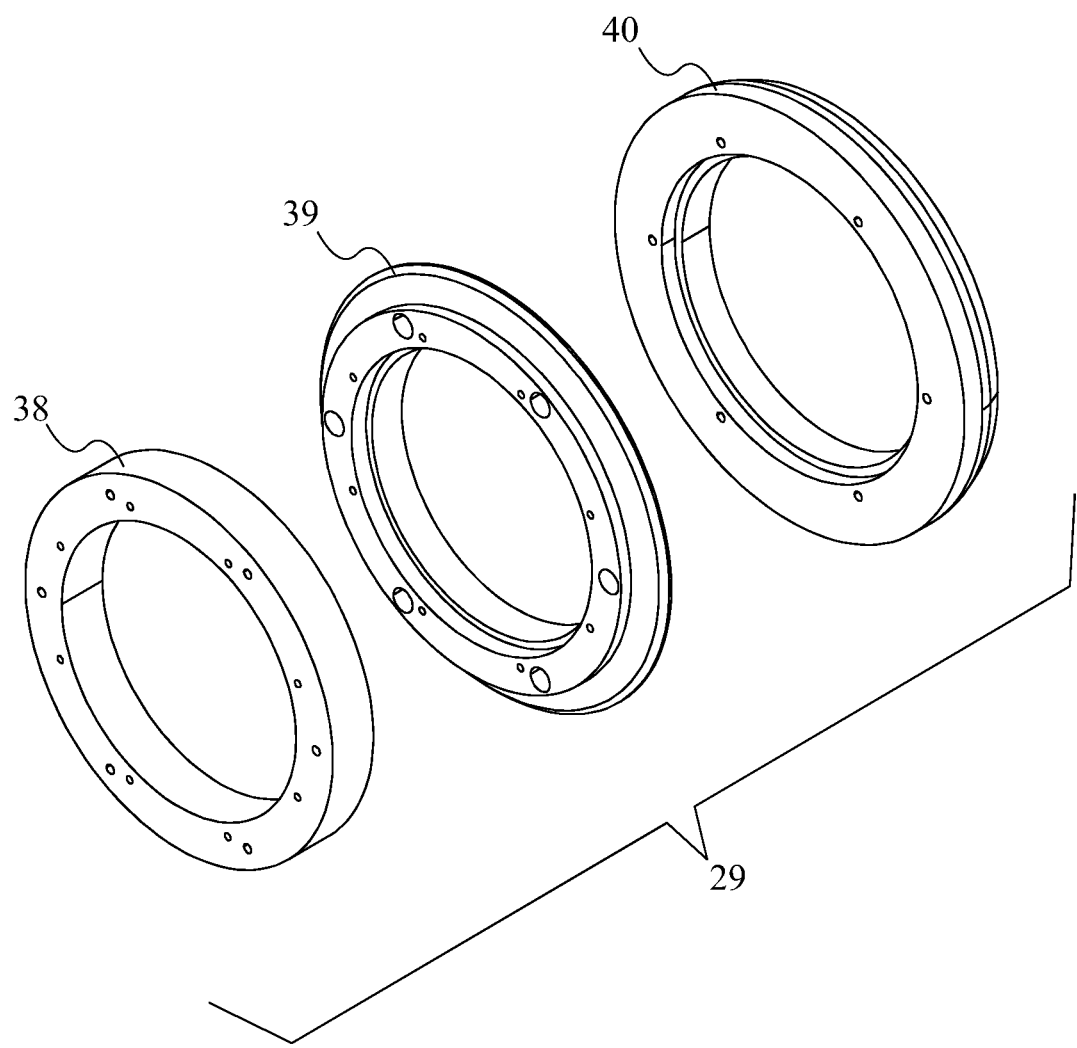
FIG. 16 is an exploded perspective view of the lens mount system.

In order for the present invention to attach a photographic lens and with reference FIG. 1, the viewfinder assembly 19 may further comprise a lens mount system 29. The lens mount system 29 is configured to accept lenses with various FFD, which can be the distance from a mounting flange of a photographic lens to the film or the image sensor plane. With reference to FIGS. 2 and 16, the present invention accepts lenses with FFD as short as 12 mm to any longer FFD. Depending on the user's need, the lens mount system 29 may comprise at least one specific lens mount 38 such as, but not limited to, a LPL, a PL, a PV, a Nikon, a Canon, or a Sony lens mount. In some embodiments, the lens mount system 29 may comprise at least one lens base mount 39 such as, but not limited to, a type-specific "E2" base mount (e.g., E2LPL, E2PL, E2PV . . . ). In some embodiments, the at least one lens base mount 39 may act as the midway connection between the at least one specific lens mount 38 and the outer tubular housing 30. In one embodiment, the outer tubular housing 30 can be purposely kept short of proper FFD to permit more lens mounting options than ever before. In another embodiment, the lens mount system 29 may comprise at least one lens mounting shim 40 which meets a set of thickness specifications. In some embodiments, the at least one lens mounting shim 40 may act as a midway connection between the at least one lens base mount 39 and the outer tubular housing 30. In still other embodiments, the specific lens mount 38 can be intentionally kept short of precise FFD, with the at least one lens base mount 39 and the at least one lens mounting shim 40 then making up the remaining distance for precise FFD of a given lens type. For use of a specified lens type, the user can simply apply its corresponding lens mount system 29. A specific lens type includes the at least one specific lens mount 38, the at least one lens base mount 39, and the at least one lens mounting shim 40. Thus, the lens mount system 29 can achieve any FFD. In order for the present invention to effectively receive an input image by attaching a photographic lens, the lens mount system 29, the aspect-ratio mask assembly 11, and the image-forming optical assembly 1 are in serial optical communication with each other.

In order for the user to easily handle the present invention, the present invention may further comprise a hand grip assembly. The hand grip assembly is structured and designed to support the present invention and comprises a handle and a support plate. The handle can be of any shape, size, and material suitable for providing a comfortable grip on the structure. The handle is rotationally coupled to the support plate and the support plate is laterally mounted to the outer tubular housing 30. The support plate can be designed to allow connection of the handle to another suitable area on the present invention.

Although the invention has been explained in relation to its preferred embodiment, it is to be understood that many other possible modifications and variations can be made without departing from the spirit and scope of the invention as hereinafter claimed.

What is claimed is:

1. A universal lens-taking optical viewfinder comprising:
an image-forming optical assembly;
an aspect-ratio mask assembly;
an attachment mechanism;
a viewfinder assembly;
the image-forming optical assembly comprising an inner tubular housing, a field lens, and a ground-glass diffuser;
the aspect-ratio mask assembly comprising a mask body and a dimensional image-defining cutout;
the inner tubular housing comprising a first inner open end and a second inner open end;
the ground-glass diffuser comprising a ground input surface and a polished output surface;
the field lens comprising an input lens surface and an output lens surface;
the image-forming optical assembly and the aspect-ratio mask assembly being optically integrated into the viewfinder assembly;
the field lens and the ground-glass diffuser being mounted within the inner tubular housing;
the ground input surface being oriented towards the first inner open end;
the polished output surface being oriented towards the input lens surface;
the input lens surface being oriented towards the polished output surface;
the output lens surface being oriented towards the second inner open end;
the dimensional image-defining cutout traversing through the mask body;
the mask body being attached to the first inner open end by the attachment mechanism; and
the dimensional image-defining cutout, the ground-glass diffuser, and the field lens being in optical serial communication with each other.

2. The universal lens-taking optical viewfinder as claimed in claim 1 comprising:
the attachment mechanism comprising at least one first magnetic ring and at least one second magnetic ring;
the at least one first magnetic ring being laterally connected around the mask body;
the at least one second magnetic ring being mounted within the inner tubular housing, adjacent to the first housing end; and
the at least one first magnetic ring being magnetically coupled to the at least one second magnetic ring.

3. The universal lens-taking optical viewfinder as claimed in claim 1 comprising:
an outer tubular housing;
the outer tubular housing comprising a first outer open end and a second outer open end;
the image-forming optical assembly and the aspect-ratio mask assembly being mounted within the outer tubular housing;
the image-forming optical assembly being positioned adjacent to the second outer open end; and
the aspect-ratio mask assembly being positioned adjacent to the first outer open end.

4. The universal lens-taking optical viewfinder as claimed in claim 3 comprising:
the outer tubular housing further comprising a tubular housing body, an access opening, and an opening cover;
the aspect-ratio mask assembly further comprising a pull tab;
the pull tab being laterally connected to the mask body;
the access opening laterally traversing into the tubular housing body;
the opening cover being laterally attached to the tubular housing body;
the opening cover being positioned across the access opening; and
the pull tab being positioned adjacent to the access opening.

5. The universal lens-taking optical viewfinder as claimed in claim 1 comprising:
the aspect-ratio mask assembly further comprising at least one aspect-ratio-adjusting insert; and
the at least one aspect-ratio-adjusting insert being attached within the dimensional image-defining cutout.

6. The universal lens-taking optical viewfinder as claimed in claim 1 comprising:
the viewfinder assembly comprising an eyepiece assembly and an optical relay assembly; and
the aspect-ratio mask assembly, the image-forming optical assembly, the optical relay assembly, and the eyepiece assembly being in serial optical communication with each other.

7. The universal lens-taking optical viewfinder as claimed in claim 6 comprising:
the optical relay assembly comprising a relay tubular housing, a relay lensing module, and a zoom helicoid;
the relay lensing module being mounted within the relay tubular housing;
the zoom helicoid being terminally mounted to the relay tubular housing, opposite to the image-forming optical assembly; and
the relay lensing module, and the zoom helicoid being in serial optical communication with each other.

8. The universal lens-taking optical viewfinder as claimed in claim 7 comprising:

the optical relay assembly further comprising at least one anamorphic module;

the at least one anamorphic module being laterally attached into the relay tubular housing, adjacent to the image-forming optical assembly; and the at least one anamorphic module, the relay lensing module, and the zoom helicoid being in serial optical communication with each other.

9. The universal lens-taking optical viewfinder as claimed in claim 6 comprising:

the eyepiece assembly comprising an eyepiece tubular housing, an eyepiece lensing module, and an eyecup;

the eyepiece lensing module being mounted within the eyepiece tubular housing;

the eyecup being terminally mounted to the eyepiece tubular housing, opposite to the optical relay assembly; and the eyepiece lensing module and the eyecup being in serial optical communication with each other.

10. The universal lens-taking optical viewfinder as claimed in claim 1 comprising:

the viewfinder assembly further comprising a lens mount system; and the lens mount system, the aspect-ratio mask assembly, and the image-forming optical assembly being in serial optical communication with each other.

11. A universal lens-taking optical viewfinder comprising:
an image-forming optical assembly;
an aspect-ratio mask assembly;
an attachment mechanism;
a viewfinder assembly;
an outer tubular housing;

the image-forming optical assembly comprising an inner tubular housing, a field lens, and a ground-glass diffuser;

the aspect-ratio mask assembly comprising a mask body and a dimensional image-defining cutout;

the inner tubular housing comprising a first inner open end and a second inner open end;

the ground-glass diffuser comprising a ground input surface and a polished output surface;

the field lens comprising an input lens surface and an output lens surface;

the attachment mechanism comprising at least one first magnetic ring and at least one second magnetic ring;

the outer tubular housing comprising a first outer open end and a second outer open end;

the image-forming optical assembly and the aspect-ratio mask assembly being optically integrated into the viewfinder assembly;

the field lens and the ground-glass diffuser being mounted within the inner tubular housing;

the ground input surface being oriented towards the first inner open end;

the polished output surface being oriented towards the input lens surface;

the input lens surface being oriented towards the polished output surface;

the output lens surface being oriented towards the second inner open end;

the dimensional image-defining cutout traversing through the mask body;

the mask body being attached to the first inner open end by the attachment mechanism;

the dimensional image-defining cutout, the ground-glass diffuser, and the field lens being in optical serial communication with each other;

the at least one first magnetic ring being laterally connected around the mask body;

the at least one second magnetic ring being mounted within the inner tubular housing, adjacent to the first housing end;

the at least one first magnetic ring being magnetically coupled to the at least one second magnetic ring;

the image-forming optical assembly and the aspect-ratio mask assembly being mounted within the outer tubular housing;

the image-forming optical assembly being positioned adjacent to the second outer open end; and the aspect-ratio mask assembly being positioned adjacent to the first outer open end.

12. The universal lens-taking optical viewfinder as claimed in claim 11 comprising:

the outer tubular housing further comprising a tubular housing body, an access opening, and an opening cover;

the aspect-ratio mask assembly further comprising a pull tab;

the pull tab being laterally connected to the mask body;

the access opening laterally traversing into the tubular housing body;

the opening cover being laterally attached to the tubular housing body;

the opening cover being positioned across the access opening; and the pull tab being positioned adjacent to the access opening.

13. The universal lens-taking optical viewfinder as claimed in claim 11 comprising:

the aspect-ratio mask assembly further comprising at least one aspect-ratio-adjusting insert; and the at least one aspect-ratio-adjusting insert being attached within the dimensional image-defining cutout.

14. The universal lens-taking optical viewfinder as claimed in claim 11 comprising:

the viewfinder assembly comprising an eyepiece assembly and an optical relay assembly; and the aspect-ratio mask assembly, the image-forming optical assembly, the optical relay assembly, and the eyepiece assembly being in serial optical communication with each other.

15. The universal lens-taking optical viewfinder as claimed in claim 14 comprising:

the optical relay assembly comprising a relay tubular housing, a relay lensing module, a zoom helicoid, and at least one anamorphic module;

the relay lensing module being mounted within the relay tubular housing;

the zoom helicoid being terminally mounted to the relay tubular housing, opposite to the image-forming optical assembly;

the relay lensing module, and the zoom helicoid being in serial optical communication with each other the at least one anamorphic module being laterally attached into the relay tubular housing, adjacent to the image-forming optical assembly; and the at least one anamorphic module, the relay lensing module, and the zoom helicoid being in serial optical communication with each other.

16. The universal lens-taking optical viewfinder as claimed in claim 14 comprising:

the eyepiece assembly comprising an eyepiece tubular housing, an eyepiece lensing module, and an eyecup;

the eyepiece lensing module being mounted within the eyepiece tubular housing;

the eyecup being terminally mounted to the eyepiece tubular housing, opposite to the optical relay assembly; and the eyepiece lensing module and the eyecup being in serial optical communication with each other.

17. The universal lens-taking optical viewfinder as claimed in claim 11 comprising:

the viewfinder assembly further comprising a lens mount system; and the lens mount system, the aspect-ratio mask assembly, and the image-forming optical assembly being in serial optical communication with each other.

\* \* \* \* \*